United States Patent [19]
Nelimarkka

[11] 3,983,757
[45] Oct. 5, 1976

[54] ACTUATOR
[75] Inventor: Juha Antti Elia Nelimarkka, Helsinki, Finland
[73] Assignee: Neles Oy, Finland
[22] Filed: Feb. 10, 1975
[21] Appl. No.: 548,803

[30] Foreign Application Priority Data
Feb. 11, 1974 Finland .................................. 376/74

[52] U.S. Cl. .................................................. 74/44
[51] Int. Cl.² ........................................ F16H 21/22
[58] Field of Search .................................. 74/42, 44

[56] References Cited
UNITED STATES PATENTS
| 437,941 | 10/1890 | Shoemaker | 74/44 |
| 2,615,398 | 10/1952 | Howard | 74/44 |
| 2,775,899 | 1/1957 | Vagneur | 74/44 |
| 2,879,815 | 3/1959 | Papworth | 74/42 |

Primary Examiner—Samuel Scott
Assistant Examiner—Wesley S. Ratliff, Jr.
Attorney, Agent, or Firm—Cushman, Darby & Cushman

[57] ABSTRACT

A two-way linear actuator for changing a linear movement of a piston into a rotating movement of a shaft. The actuator is operated by some mechanical device generally comprising two cylinders, a piston movable inside the cylinders, a torque shaft at a right angle to the piston movement, and a machine element connecting the torque shaft to the piston located within the piston, and sealed from the interior of the cylinders.

4 Claims, 2 Drawing Figures

ACTUATOR

BACKGROUND AND SUMMARY OF THE INVENTION

This invention relates to a valve actuator operated by hydraulics, pneumatics or springs or some other mechanic devices and consisting of a cylinder suitably in two sections and provided with inlet and outlet openings for operating medium, a piston moving inside the cylinder and preferably in one piece and provided with sealings at both ends, a torque shaft passing outside the cylinder, and a machine element connecting the piston and the torque shaft.

Hydraulic, pneumatic and mechanic valve actuators of several various types, changing a linear piston movement into a rotating movement controlling a valve, are previously known. All these known devices have, however, a disadvantage either in a complicated and costly construction or a great size in relation to the power.

The actuator according to the invention is characterized in that a torque shaft, at a right angle to the direction of the piston movement, and a machine element or joint connecting the torque shaft to the piston are located in the space formed inside the end flanges of the piston, the piston sealings and the cylinder walls and separated from the operating medium, and that the piston section connecting the end flanges of the piston is provided with an opening or openings for the torque shaft passing into the piston or through the piston.

When comparing the device of this invention to actuators in which the cylinders and the so called torque centre, formed by the torque shaft, the machine element connecting the torque shaft to the piston, and the casing section, are separate entities, the actuator of this invention is considerably shorter in the longitudinal direction as the torque centre is located inside the piston. Besides this, the number of parts is smaller. A third considerable advantage is the small amount of sealings or other tight connections. The only sealings required are the piston sealings. As the operating medium cannot pass into the space inside the piston, it is not necessary to seal the division plane of the cylinders or the opening where the torque shaft passes outside.

BRIEF DESCRIPTION OF THE DRAWINGS

The invention is described in detail in the following with reference to the accompanying drawing in which.

DETAILED DESCRIPTION OF THE INVENTION

Figure 1:
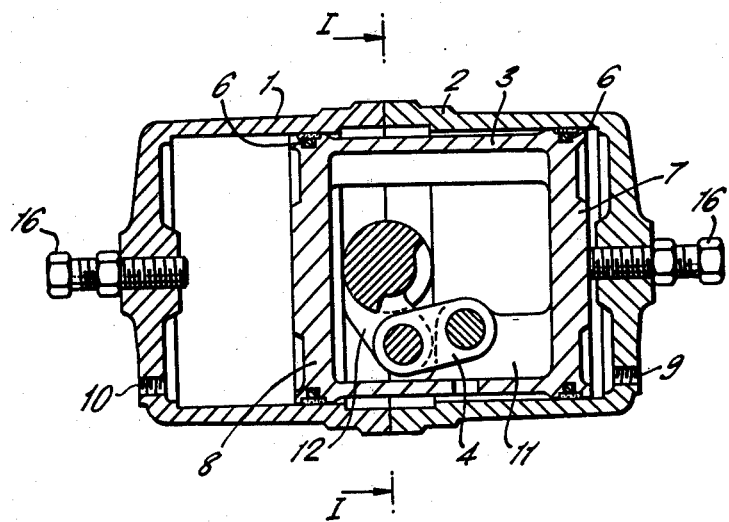
FIG. 1 shows a side view of an actuator according to the invention, in section taken in the centre in the longitudinal direction of the cylinders.
Figure 2:
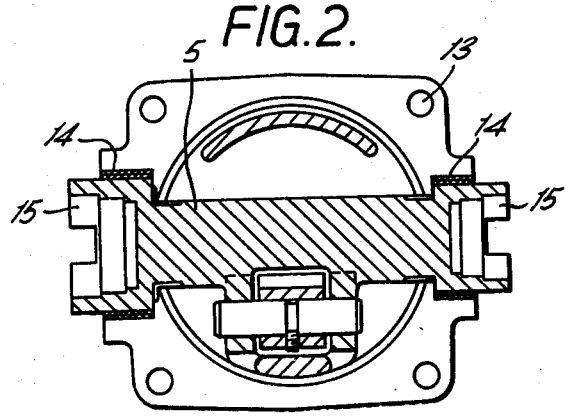
FIG. 2 shows the actuator of FIG. 1, in section taken along line I—I.

The actuator comprises two cylinders 1 and 2 joined together by screws 13, a piston 3 with sealings 6 and moving inside the cylinders, a torque shaft 5 with bearings 14 and positioned in the space between the end flanges 7 and 8 of the piston and passing through the cylinder walls at the division plane, and a bar 4 connecting the torque shaft with the piston and pivotally connected to projections 11 and 12 of the piston and the torque shaft. At the end of each cylinder there is a screw for adjusting the length of the piston stroke, and an inlet and outlet opening 9 and 10 for the operating medium.

When medium under pressure is led to the cylinder 1 through the opening 10, for instance, the piston 3 moves towards the bottom of the cylinder 2 until the end 7 abuts the adjusting screw 16. While the piston moves, the connection bar 4 forces the torque shaft 5 to turn a certain angle around its centre line. At the same time a shaft of a closing device of a valve, connected to either end 15 of the torque shaft, also turns. An opposite movement is brought about by leading medium under pressure to the cylinder 2 through the opening 9.

The invention is not restricted to the above embodiment and it can vary considerably within the scope of the claims. So, for instance, the movement of the piston 3 can be transmitted to the torque shaft 5 by means of a toothed bar-toothed wheel gear. In that case it is possible to use a cylinder in one piece the open end of the cylinder being closed by means of a separate end plate.

I claim:
1. A two-way actuator for changing the linear movement of a piston into arcuate movement of a shaft comprising
   a pair of cylinder portions each having an open end face and a closed end face and joined together at said open end faces thereof to form a cylinder,
   a piston mounted for linear sliding movement in said cylinder in a first direction, said piston having spaced first and second ends thereof, each of said ends being in fluid-tight sliding relationship with said cylinder,
   a fluid opening disposed in each end face of said cylinder for allowing fluid to enter said cylinder for cooperation with respective piston end,
   a torque shaft extending completely through said cylinder between the spaced ends of said piston in a direction perpendicular to the direction of sliding movement of said piston, said torque shaft having both ends thereof journaled in oppositely disposed openings in said cylinder, and
   means for operatively connecting said piston to said torque shaft so that sliding movement of said piston is converted into arcuate movement of said torque shaft, said means for connecting said piston to said torque shaft being disposed within said piston, between the spaced ends thereof.
2. An actuator as recited in claim 1 wherein said means for connecting said piston to said torque shaft converts sliding movement of said piston into limited back-and-forth arcuate movement of said torque shaft so that said torque shaft never rotates 360°.
3. An actuator as recited in claim 2 wherein said means for connecting said piston to said torque shaft includes a bar pivotally connected to an extension of said torque shaft and pivotally connected to an interior portion of said piston.
4. An actuator as recited in claim 1 wherein the diameter of said cylinder is substantially constant, not having a significantly larger diameter in the portion thereof between the end faces of said piston than adjacent the end faces thereof.

* * * * *